United States Patent
Moubarak et al.

(10) Patent No.: US 11,760,211 B2
(45) Date of Patent: Sep. 19, 2023

(54) SYSTEM AND METHOD FOR CHANGING GEAR RANGES OF AN ELECTRIC VEHICLE

(71) Applicant: Ford Global Technologies, LLC, Dearborn, MI (US)

(72) Inventors: Paul M. Moubarak, Redford Township, MI (US); Shubham Dixit, Dearborn, MI (US); Joseph Jay Torres, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 341 days.

(21) Appl. No.: 16/569,567

(22) Filed: Sep. 12, 2019

(65) Prior Publication Data

US 2021/0078412 A1     Mar. 18, 2021

(51) Int. Cl.
    *F16H 63/32*     (2006.01)
    *B60L 15/20*     (2006.01)
    *H02K 7/116*    (2006.01)
    *F16H 57/02*     (2012.01)

(52) U.S. Cl.
    CPC .......... *B60L 15/2054* (2013.01); *F16H 63/32* (2013.01); *H02K 7/116* (2013.01); *B60W 2710/081* (2013.01); *B60W 2710/083* (2013.01); *F16H 2057/02034* (2013.01); *F16H 2057/02043* (2013.01)

(58) Field of Classification Search
    CPC .......... F16H 63/32; F16H 2057/02043; F16H 2057/02034; F16H 63/502; F16H 2061/0422; F16H 2061/0474; F16H 2003/0811; F16H 3/089; F16H 2200/0021; F16H 2200/0034; F16H 61/32; F16H 61/0204; B60K 2001/001; B60W 2510/1015; B60W 2710/086; B60W 2710/081; B60W 2710/083; B60W 2710/021; B60W 2710/022; B60W 2710/1005; B60W 2710/023; B60W 2510/08
    USPC ................................... 74/330, 331
    See application file for complete search history.

(56) References Cited

U.S. PATENT DOCUMENTS

| | | | |
|---|---|---|---|
| 5,409,432 A * | 4/1995 | Steeby ................ | F16H 61/0403 477/91 |
| 6,095,947 A * | 8/2000 | Genise ................ | B60W 10/111 477/111 |
| 6,286,379 B1 | 9/2001 | Yester et al. | |
| 9,234,565 B2 | 1/2016 | Zhang et al. | |
| 9,638,302 B2 | 5/2017 | Smetana et al. | |
| 9,809,098 B2 | 11/2017 | Tsao et al. | |

(Continued)

FOREIGN PATENT DOCUMENTS

| WO | WO-2013058238 A1 * | 4/2013 | ............ B60W 20/00 |
|---|---|---|---|
| WO | WO-2020193697 A1 * | 10/2020 | ............ F16H 61/04 |

*Primary Examiner* — Jacob S. Scott
*Assistant Examiner* — Farhana Pervin
(74) *Attorney, Agent, or Firm* — Vincent Mastrogiacomo; McCoy Russell LLP

(57) ABSTRACT

Methods and system are described for changing a gear ratio of an axle gearbox that does not include friction clutches and that may or may not include synchronizers. The axle gearbox may receive propulsive force via an electric machine. The methods and systems permit the axle gearbox to be shifted from a high gear range to a low gear range while a vehicle that includes the axle gearbox is moving.

18 Claims, 8 Drawing Sheets

(56) References Cited

U.S. PATENT DOCUMENTS

| | | | |
|---|---|---|---|
| 9,841,092 B2 | 12/2017 | Wenthen et al. | |
| 10,137,775 B2 | 11/2018 | Grutter et al. | |
| 2003/0096671 A1 | 5/2003 | Tanzer et al. | |
| 2007/0278022 A1* | 12/2007 | Tanishima | B60L 58/12 |
| | | | 180/65.285 |
| 2009/0118074 A1* | 5/2009 | Zettel | B60K 6/547 |
| | | | 477/3 |
| 2011/0174557 A1* | 7/2011 | Tanba | B60K 6/36 |
| | | | 903/902 |
| 2014/0046559 A1* | 2/2014 | Minami | B60W 10/02 |
| | | | 701/54 |
| 2015/0057866 A1* | 2/2015 | Tseng | B60W 10/10 |
| | | | 701/22 |
| 2018/0162362 A1* | 6/2018 | Cho | B60W 30/19 |

\* cited by examiner

SYSTEM AND METHOD FOR CHANGING GEAR RANGES OF AN ELECTRIC VEHICLE

FIELD

The present description relates generally to methods and systems for shifting gear ranges of an axle of an electric vehicle. The gear ranges may be included in a gearbox that is coupled to an axle.

BACKGROUND/SUMMARY

A vehicle may include a transmission and a gearbox. The gearbox may include two gear ranges. The first gear range may be a low gear range and the second gear range may be a high gear range. The high gear range may allow the vehicle to operate at highway speeds and during conditions where road surfaces have a higher coefficient of friction. The low gear range may allow the vehicle to achieve improved traction at low vehicle speeds and when road surfaces have a lower coefficient of friction. The gearbox may be shifted from the high range to the low range by stopping the vehicle and shifting the gearbox from the high range to the low range or vice-versa. However, a vehicle's driver may consider stopping the vehicle to change gearbox ranges to be time consuming and inefficient. Therefore, it may be desirable to provide a way of shifting a gearbox from a high range to a low range without having to stop the vehicle.

The inventors herein have recognized the above-mentioned issues and have developed a method for operating a driveline, comprising: while an axle is rotating a gear of an axle gearbox that does not include a friction clutch, adjusting a speed of an electric machine such that a speed of a first shaft multiplied by a ratio of a gear between the first shaft and a second shaft is a threshold speed amount greater than a speed of the second shaft; reducing an amount of electric power supplied to the electric machine in response to the speed of the first shaft multiplied by the ratio of the gear between the first shaft and the second shaft being the threshold speed amount greater than the speed of the second shaft; and adjusting a position of a shift fork in response to reducing electric power supplied to the electric machine.

By adjusting speed of an electric machine that is coupled to an axle gearbox shaft such that a speed of the axle gearbox shaft multiplied by a gear ratio is greater than a speed of an axle gearbox output shaft, it may be possible to provide the technical result of shifting the gearbox in a way that reduces the possibility of gearbox degradation. In particular, once speed of the shaft multiplied by the gear ratio is greater than speed of the output shaft, the electric machine may be allowed to free-wheel so that the shaft may be coupled to the output shaft via synchronizers or a sliding engagement mechanism without degrading the synchronizers or the sliding engagement mechanism. Allowing the electric machine to free wheel may allow the gearbox shaft speed to be reduced to the gearbox output shaft speed so that very little speed difference may be absorbed via the synchronizer or the sliding engagement mechanism, thereby reducing the possibility of gearbox degradation.

The present description may provide several advantages. In particular, the approach allows for axle gearbox gear ratio changes while a vehicle is moving. In addition, the approach may reduce the possibility of axle gearbox degradation via reducing speed differences between shafts of the gearbox before engaging a new gear. The approach also provides for shifting from a higher gear range to a lower gear range or vice-versa.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
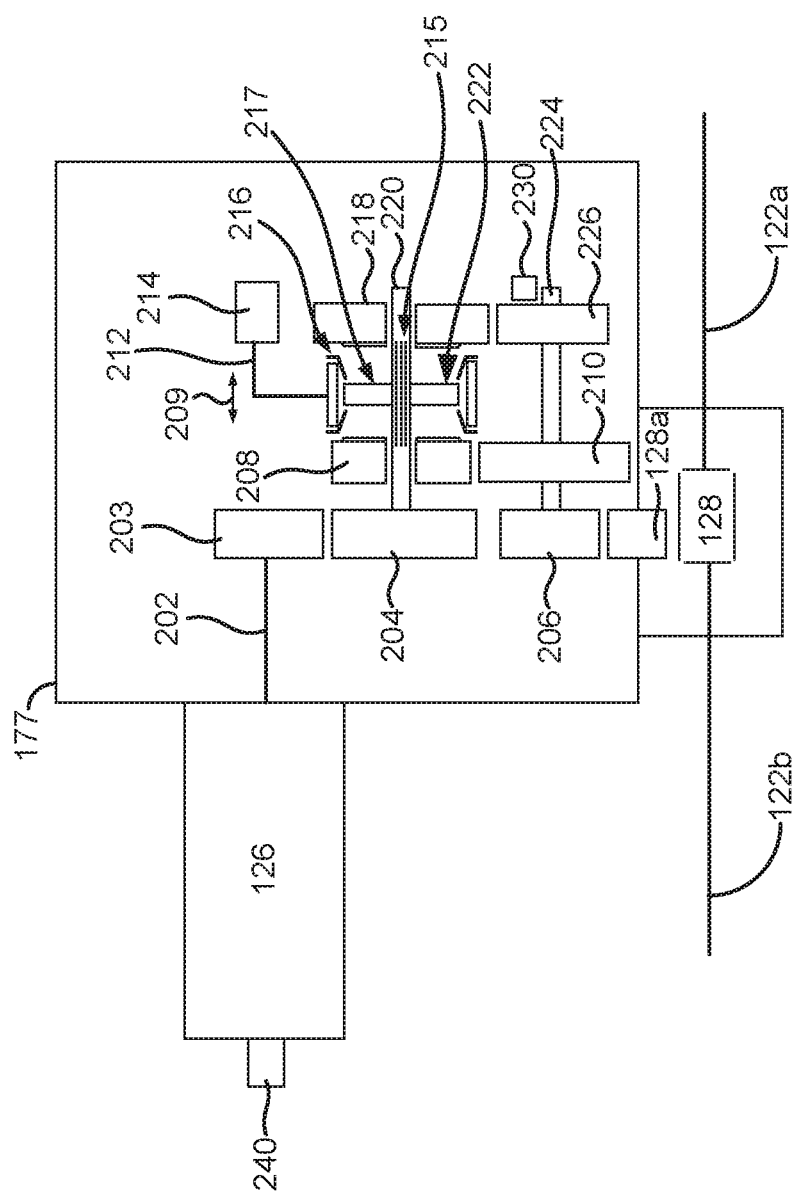
FIGS. 2 and 3 show two different example axle gearboxes.
Figure 3:
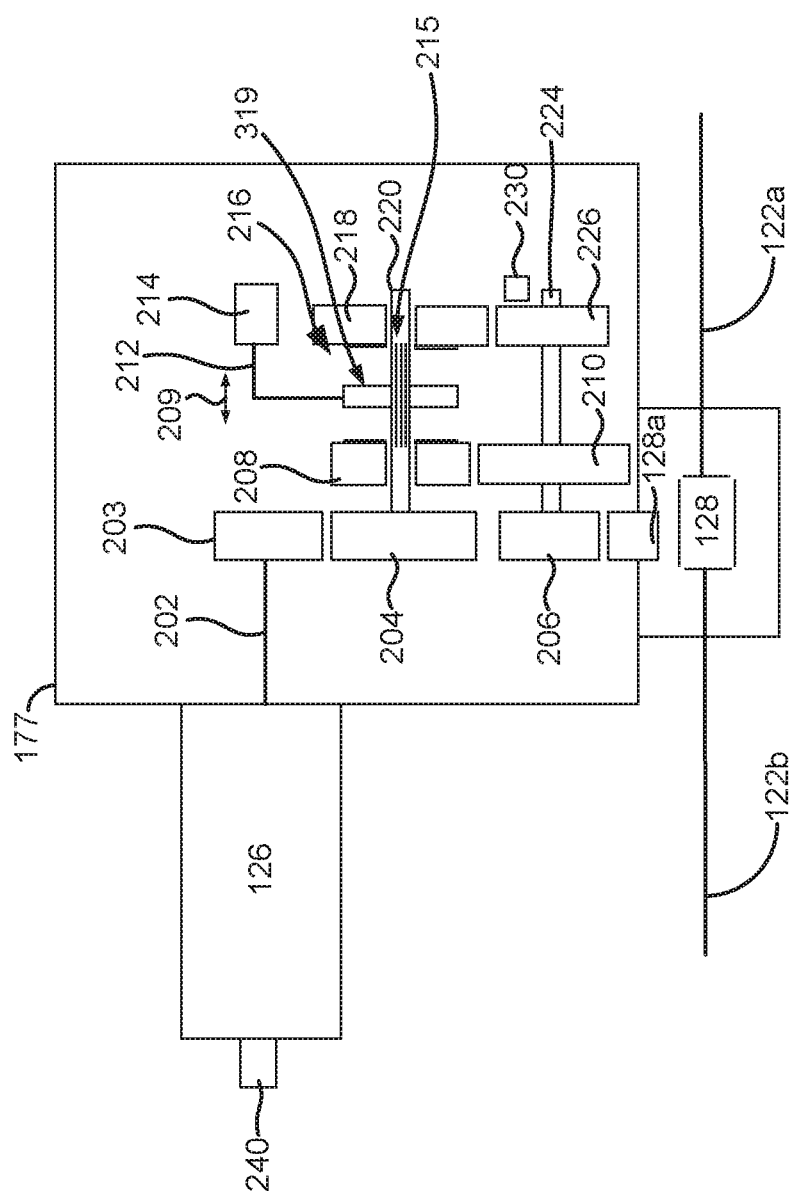
Figure 4:
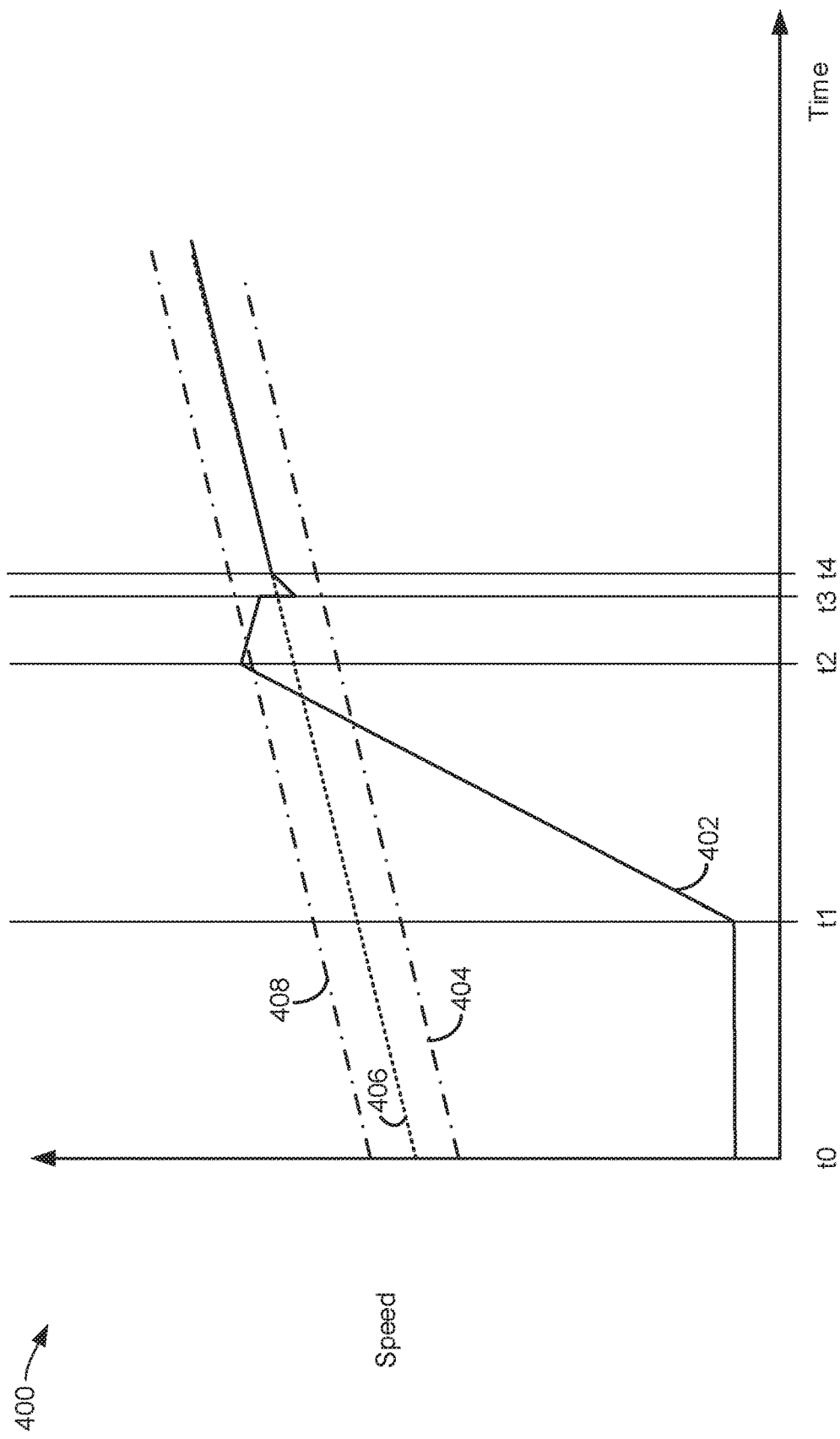
FIGS. 4-6 show example gearbox shifting sequences according to the method of FIGS. 7 and 8.
Figure 5:
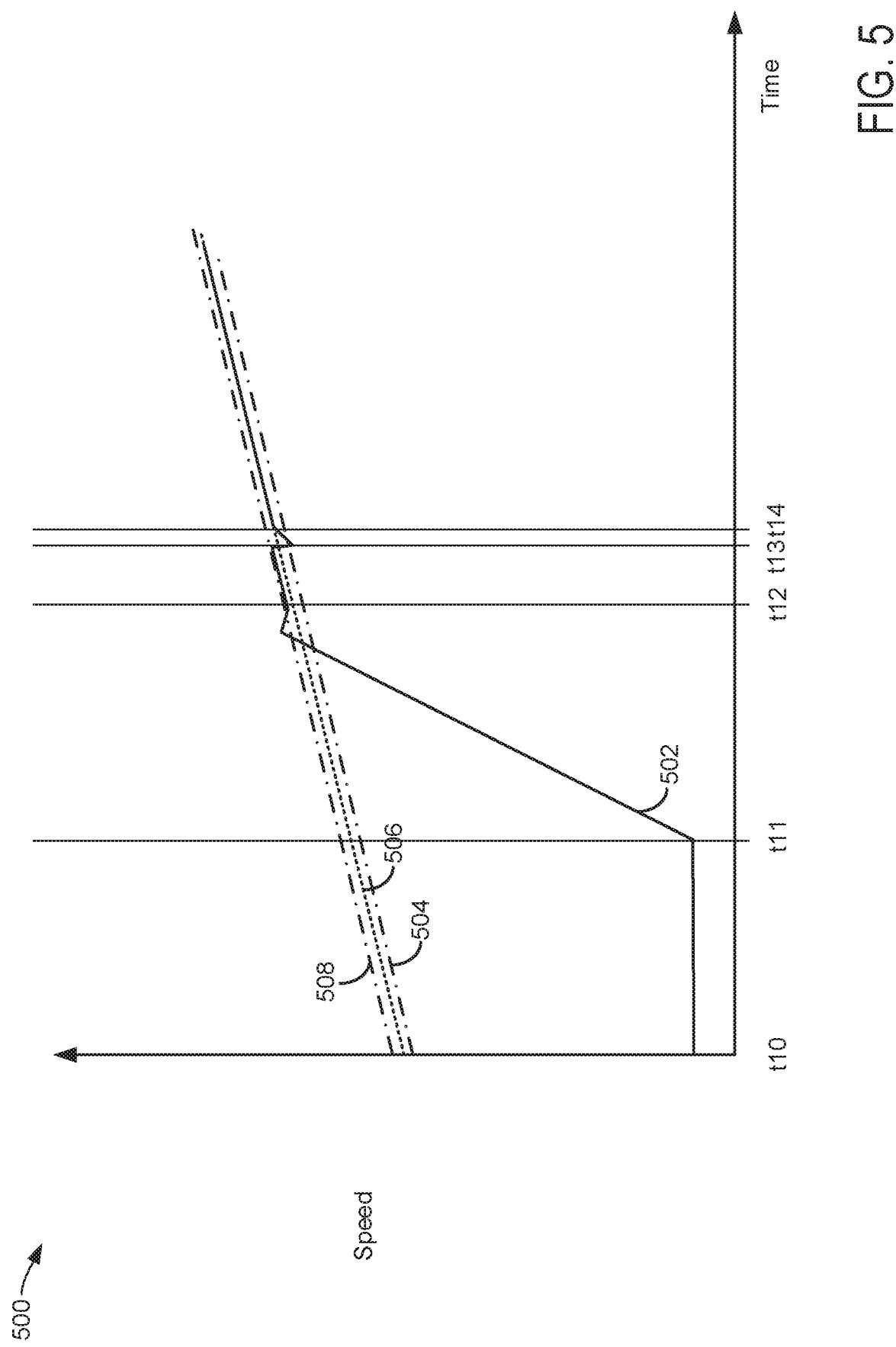
Figure 6:
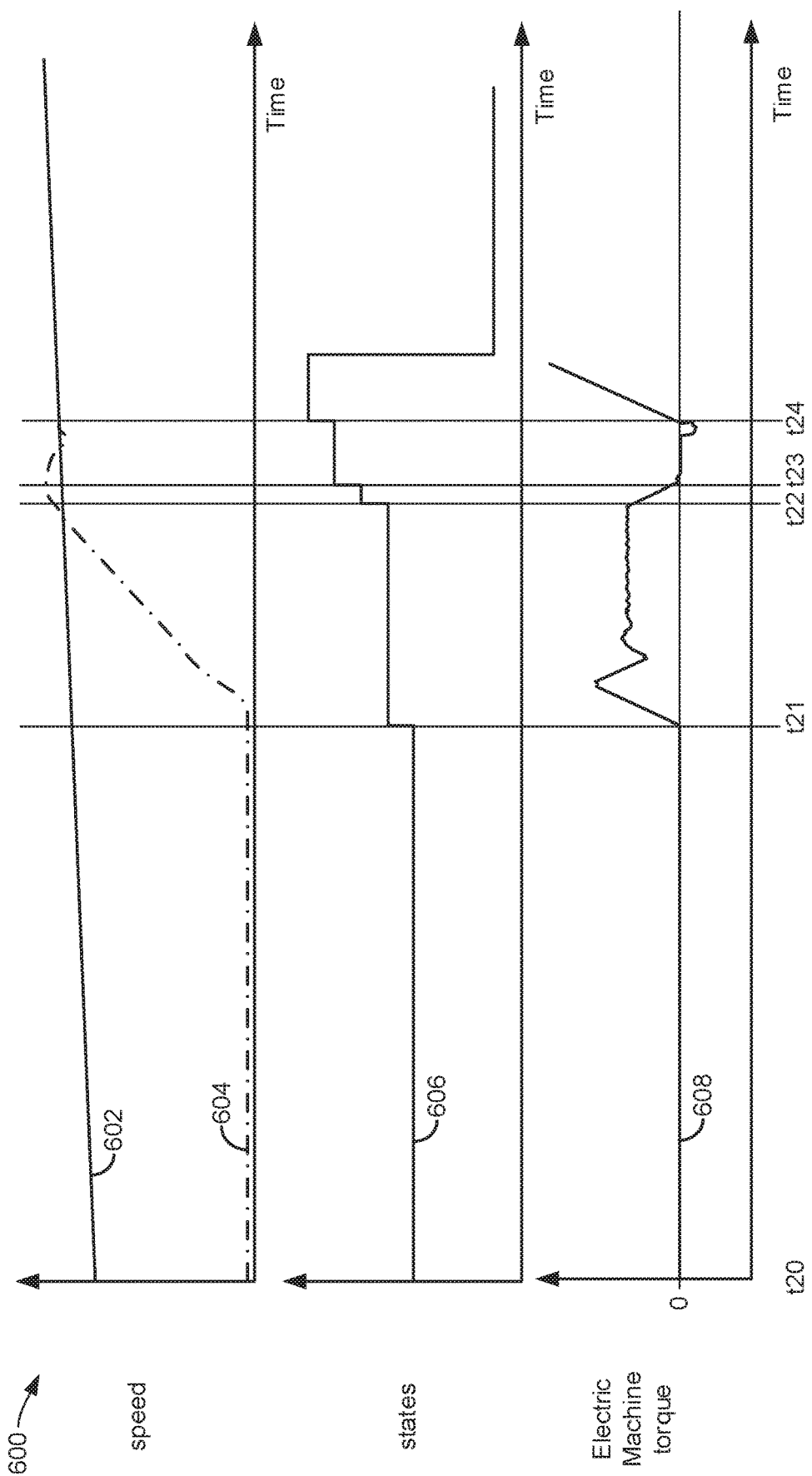

The following description relates to systems and methods for operating an axle gearbox of a vehicle. The vehicle may be an electric vehicle and the electric vehicle may include an electric machine that is coupled to an axle gearbox. The axle gearbox may be coupled to a differential gear set of an axle. The axle gearbox may not include friction clutches, but it may include two or more gear ratios. In addition, the axle gearbox may or may not include synchronizers for coupling gears to a shaft of the axle gearbox. An example vehicle and driveline or powertrain may be of the type shown in FIG. 1. The powertrain may include an axle that includes a gearbox as shown in FIGS. 2 and 3. The gearbox may be operated as shown in FIGS. 4-6 according to the method of FIGS. 7 and 8.

Figure 1:
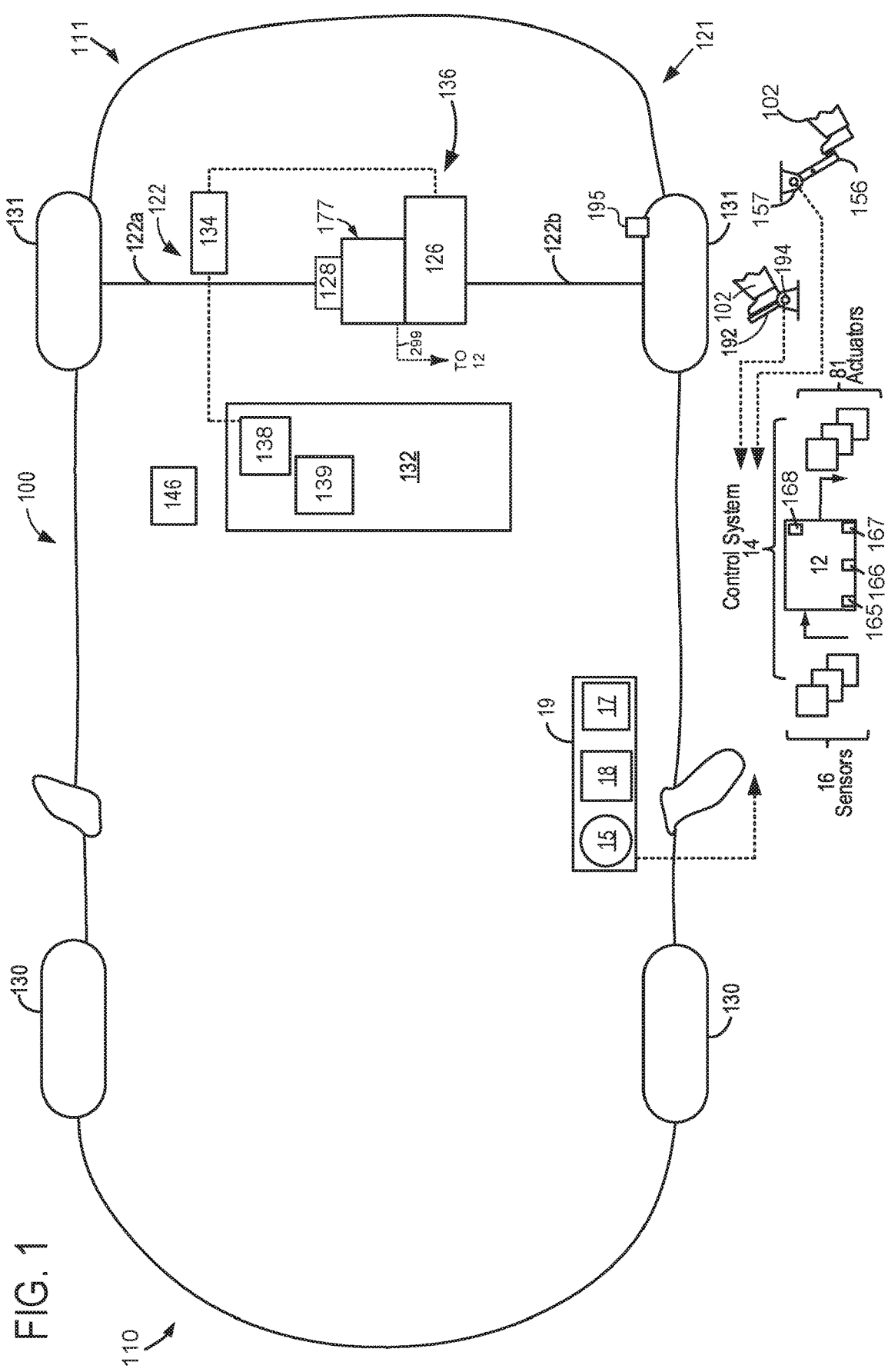
FIG. 1 is a schematic diagram of a vehicle driveline is shown.

FIG. 1 illustrates an example vehicle propulsion system 100 for vehicle 121. A front portion of vehicle 121 is indicated at 110 and a rear portion of vehicle 121 is indicated at 111. Vehicle propulsion system 100 includes a rear electric machine 126, but in some examples a front electric machine (not shown) may be provided in place of, or in addition to, rear electric machine 126. Electric machine 126 may consume or generate electrical power depending on its operating mode. Throughout the description of FIG. 1, mechanical connections between various components are illustrated as solid lines, whereas electrical connections between various components are illustrated as dashed lines.

Vehicle propulsion system 100 includes a rear axle 122. In some examples, rear axle may comprise two half shafts, for example first half shaft 122*a*, and second half shaft 122*b*. Vehicle propulsion system 100 further has front wheels 130 and rear wheels 131. In this example, rear wheels 131 may be driven via electric machine 126.

The rear axle 122 is coupled to differential gear set 128 and differential gear set 128 is directly coupled to axle gearbox 177 as shown in greater detail in FIGS. 2 and 3. Rear electric machine 126 is coupled to axle gearbox 177. Rear drive unit 136, which includes electric machine 126 and axle gearbox 177, may transfer power from electric machine 126 to axle 122 resulting in rotation of drive wheels 131. Rear drive unit 136 may include two or more gears as shown in greater detail in FIGS. 2 and 3. Axle gearbox 177 may receive control commands (e.g., actuator commands) and send axle data to controller 12 via controller area network (CAN) 299. A similar axle arrangement may be positioned at front wheels 130 for four wheel drive and front wheel drive variants.

Electric machine 126 may receive electrical power from onboard electrical energy storage device 132. Furthermore, electric machine 126 may provide a generator function to convert the vehicle's kinetic energy into electrical energy, where the electrical energy may be stored at electric energy storage device 132 for later use by the electric machine 126. An inverter system controller (ISC1) 134 may convert alternating current generated by rear electric machine 126 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 126, energy storage device 132, etc. Control system 14 may receive sensory feedback information from one or more of electric machine 126, energy storage device 132, etc. Further, control system 14 may send control signals to one or more of electric machine 126, energy storage device 132, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include a motor electronics coolant pump (MECP) 146. MECP 146 may be used to circulate coolant to diffuse heat generated by at least electric machine 126 of vehicle propulsion system 100, and the electronics system. MECP may receive electrical power from onboard energy storage device 132, as an example.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) (not shown), wheel speed sensor(s) 195, etc. In some examples, sensors associated with electric machine 126, wheel speed sensor 195, etc., may communicate information to controller 12, regarding various states of electric machine operation. Controller 12 includes non-transitory (e.g., read only memory) 165, random access memory 166, digital inputs/outputs 168, and a microcontroller 167.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 126) based on an operator input. Various examples of the operator ignition interface 15 may include interfaces that require a physical apparatus, such as an active key, that may be inserted into the operator interface 15 to start the electric machine 126 and to turn on the vehicle, or may be removed to shut down the electric machine 126 to turn off the vehicle. Other examples may include a passive key that is communicatively coupled to the operator interface 15. The passive key may be configured as an electronic key fob or a smart key that does not have to be inserted or removed from the interface 15 to operate the vehicle electric machine 126. Rather, the passive key may need to be located inside or proximate to the vehicle (e.g., within a threshold distance of the vehicle). Still other examples may additionally or optionally use a start/stop button that is manually pressed by the operator to start or shut down the electric machine 126 to turn the vehicle on or off. In other examples, a remote electric machine start may be initiated remote computing device (not shown), for example a cellular telephone, or smartphone-based system where a user's cellular telephone sends data to a server and the server communicates with the vehicle controller 12 to start the engine.

The system of FIG. 1 provides for a vehicle system, comprising: an axle gearbox not including friction clutches or gear synchronizers and including a shift fork, a first shaft, a first gear, a second gear, and a second shaft; an electric machine coupled to the axle gearbox; a differential gear set coupled to the axle gearbox; and a controller including executable instructions stored in non-transitory memory to operate the electric machine in a speed control mode in response to a request to shift the axel gearbox from a first gear to a second gear, and adjust a position of the shift fork in response to a speed slope of the first shaft multiplied by a ratio of the first gear being substantially equal to a speed slope of the second shaft. The system further comprises additional instructions to accelerate the electric machine in the speed control mode such that a speed of the first shaft multiplied by the ratio of the first gear is greater than a speed of the second shaft. The system further comprises coupling the second shaft to the electric machine via a first gear. The system further comprises coupling the second shaft to the first shaft via the first gear or the second gear. The system further comprises additional instructions to continue operating the electric machine in the speed control mode while adjusting the position of the shift fork. The system further comprises additional instructions to exit the electric machine from the speed control mode in response to the shift fork being in a desired position. The system further comprises additional instructions to operate the electric machine in a torque control mode in response to the shift fork being in the desired position. The system further comprises additional instructions to deliver a driver demand torque via the electric machine while operating the electric machine in the torque control mode.

Referring now to FIG. 2, a detailed view of a first example axle gearbox 177 is shown. Axle gearbox 177 does not include friction a friction clutch that locks a gear to a shaft. A speed of electric machine 126 may be reported to controller 12 via speed sensor 240. Electric machine 126 is coupled to axle gearbox 177. Electric machine 126 is directly coupled to input shaft 202. Input shaft 202 is directly coupled to input gear 203 and input gear 203 is directly coupled to intermediate gear 204. Intermediate gear 204 is directly coupled to intermediate shaft 220. However, in some examples, electric machine 126 may be coupled directly to intermediate shaft 220. Intermediate shaft 220 includes splines 215 that allow gear engagement collar 217 to slide in a longitudinal direction as indicated by arrow 209. Splines 215 prevent gear engagement collar 217 from rotating about intermediate shaft 220, such that gear engagement collar 217 rotates at a same speed as intermediate shaft 220. Intermediate shaft 220 supports gear engagement collar 217. Synchronizers 216 may reduce a speed difference between intermediate shaft 220 and low gear 208. Alternatively, synchronizers 216 may reduce a speed difference between intermediate shaft 220 and high gear 218. Intermediate shaft 220 may rotate without rotating low gear 208 and high gear 218 when gear engagement collar 217 and synchronizers 216 are in a neutral position as shown. Thus, low gear 208 and high gear 218 may rotate around intermediate shaft 220 when low gear 208 and high gear 218 are not engaged to intermediate shaft 220. Gear engagement collar 217 and synchronizers 216 may lock intermediate shaft to low gear 208 or to high gear 218 via teeth on gear engagement collar 217 (not shown) so that input shaft 202 rotates at a ratio of a rate that output shaft 224 rotates. Actuator 214, which may be an electric actuator or a hydraulic actuator, may adjust a position of gear engagement collar 217 and synchronizers 216 to selectively engage and disengage low gear 208 and high gear 218.

Low gear 208 is directly coupled to gear 210 and high gear 218 is directly coupled to gear 226. Gears 210 and 226 are directly coupled to output shaft 224 and gears 210 and 226 rotate at a same speed as output shaft 224. Output gear 206 is directly coupled to output shaft 224 and gear 128a of differential gear set 128. Output gear 206 causes half shafts 122b and 122a to rotate when output gear 206 rotates. A speed of output shaft 224 may be reported to controller 12 via output shaft speed sensor 230.

Thus, axle gearbox 177 may include synchronizers 216 to match speeds of an input shaft or an intermediate shaft to speeds of gears (e.g., 204 and 218) that rotate at a speed multiple of an output shaft. However, the synchronizers 216 may have limited capacity to reduce a speed differential between an input shaft or an intermediate shaft and an output shaft. Nevertheless, electric machine 126 may be operated in a speed control mode so that less of the speed reducing capacity of synchronizers 216 may be used when engaging low gear 208 and engaging high gear 218.

Referring now to FIG. 3, an alternative axle gearbox 177 is shown. This example axle gearbox includes many of the same components as the axle gearbox shown in FIG. 2. The components that are shown in FIG. 3 that are numbered the same as components shown in FIG. 2 are the same components that are shown in FIG. 2. In addition, the components that are shown in FIG. 3 that are numbered the same as components shown in FIG. 2 operate in the same way as described in the description of FIG. 2.

Gearbox 177 includes a sliding sleeve or dog clutch 319 that may lock low range gear 208 to intermediate shaft 220 via interference between teeth (not shown) of sleeve or dog clutch 319 and teeth or receptacles (not shown) of low gear 208. Alternatively, sliding sleeve or dog clutch 319 that may lock high range gear 218 to intermediate shaft via interference between teeth (not shown) of sleeve or dog clutch 319 and teeth or receptacles (not shown) of high gear 218. Intermediate shaft 220 includes splines 215 that allow sleeve or dog clutch 319 to slide in a longitudinal direction as indicated by arrow 209. Splines 215 prevent sleeve or dog clutch 319 from rotating about intermediate shaft 220, such that sleeve or dog clutch 319 rotates at a same speed as intermediate shaft 220. Intermediate shaft 220 supports sleeve or dog clutch 319.

Thus, axle gearbox 177 may include a sliding sleeve 319 to couple a low range gear 208 to an input shaft or an intermediate shaft so that input shaft 202 rotates when output shaft 224 rotates. However, the sliding sleeve 319 may not be engaged to low range gear 208 or high range gear 218 from a neutral position when there is a large speed difference between intermediate shaft 220 and low range gear 208 or high range gear 218. Nevertheless, electric machine 126 may be operated in a speed control mode so that a speed difference between intermediate shaft 220 and low range gear 208 or high range gear 218 is low so that sleeve 319 may lock low range gear 208 or high range gear 218 to intermediate shaft 220, thereby shifting gears.

The axle gearboxes shown in FIGS. 2 and 3 are exemplary in nature and are not intended to limit the scope of this disclosure. For example, some axle gearboxes may couple electric machine 126 directly to shaft 220. Further, in some examples, output shaft 224 may rotate at a same speed as half shafts 122b and 122a when vehicle 121 is traveling in a straight direction with no wheel slip.

Figure 7:
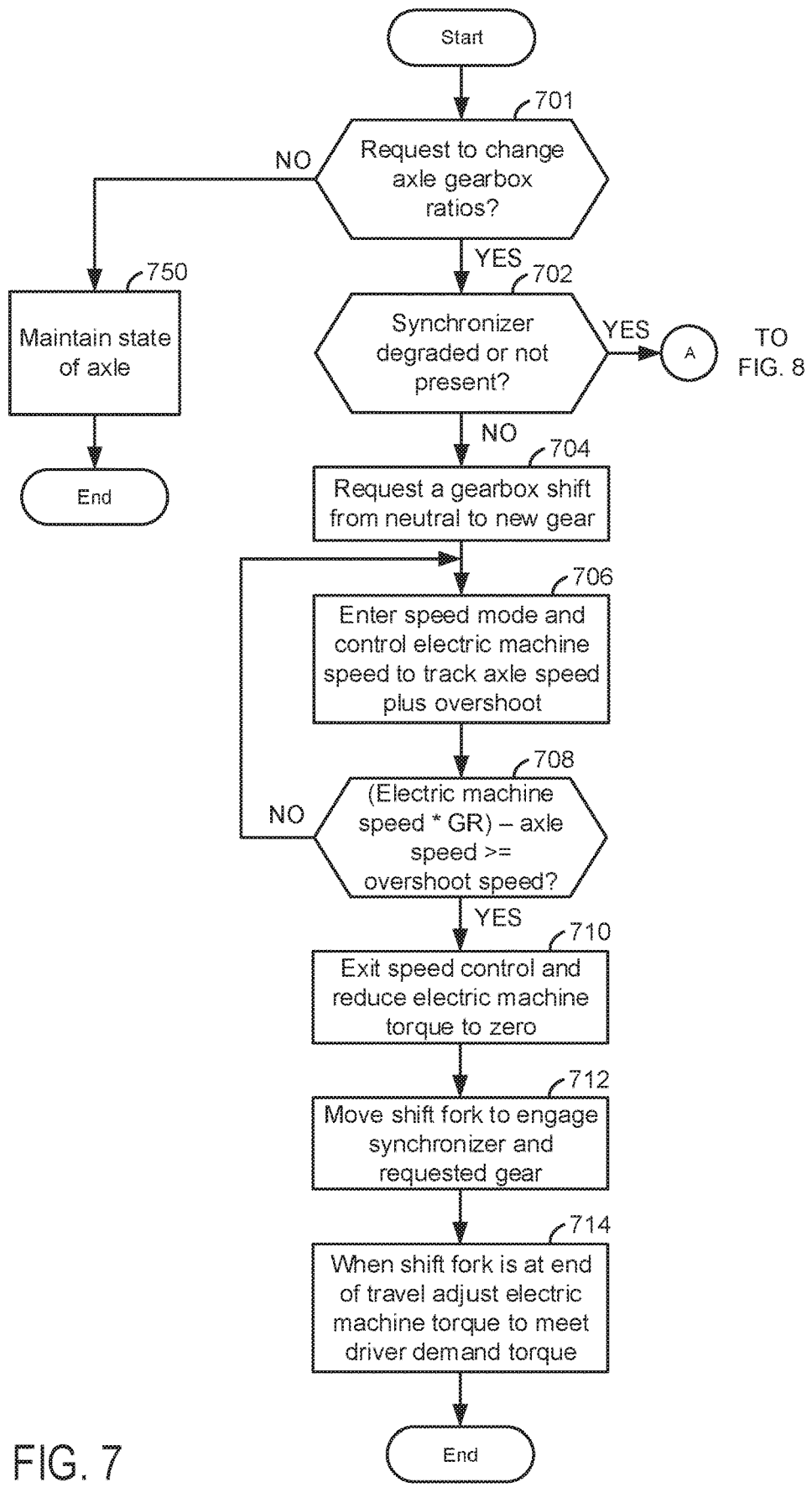
FIGS. 7 and 8 show an example of a method for operating a driveline of an electric vehicle.
Figure 8:
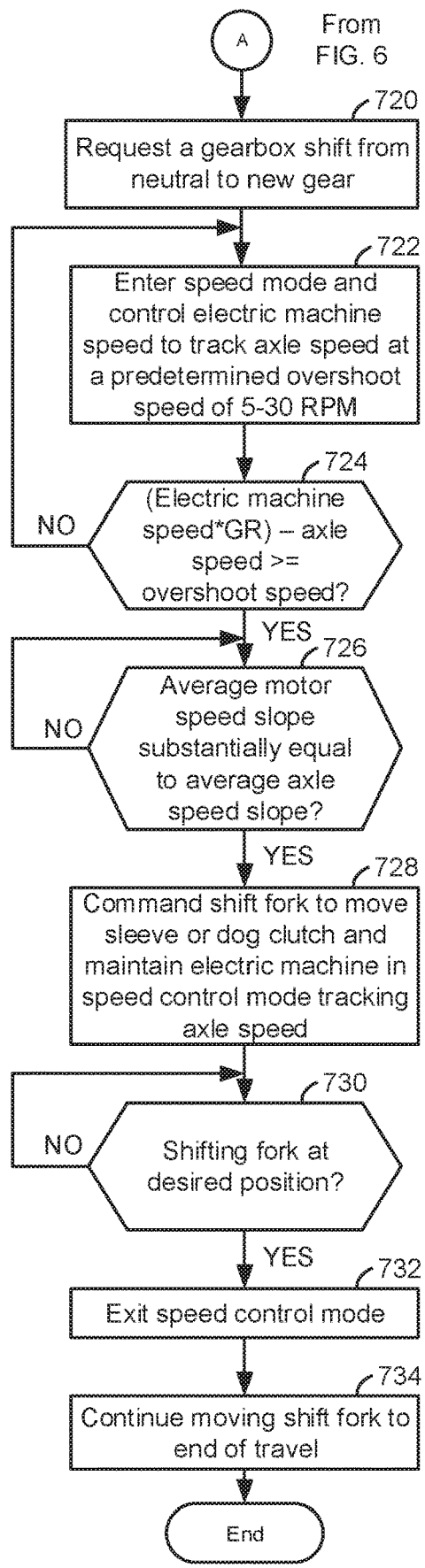

Referring now to FIG. 4, a prophetic vehicle operating sequence according to the method of FIGS. 7 and 8 is shown. The method of FIG. 4 is a method that may be performed when the axle gearbox includes synchronizers and does not include friction clutches. The vehicle operating sequence shown in FIG. 4 may be provided via the method of FIGS. 7 and 8 in cooperation with the system shown in FIG. 1. The vertical lines at t0-t4 represent times of interest during the sequence. The sequence of FIG. 4 takes place when an accelerator pedal is applied by a driver such that the wheel torque request is non-zero and while the vehicle is moving on a road.

Plot 400 includes a vertical axis and a horizontal axis. The vertical axis represents speed and speed increases in the direction of the vertical axis arrow. Speed at the level of the horizontal axis is zero. The horizontal axis represents time and time increases from the left side of the plot to the right side of the plot.

Dashed line 406 represents a speed of shaft 224 of an axle gearbox and solid line 402 represents a speed of shaft 220 multiplied by the gear ratio of the gear to be or being engaged (e.g., the gear ratio between shaft 202 and shaft 224 when low gear 208 is going to be or is being engaged). Dashed-dot line 408 represents an upper threshold speed difference between speed of shaft 224 and speed of shaft 220 multiplied by the ratio of the gear to be engaged. Dashed-dot line 408 may also be referred to as an over-shoot speed. Dashed-dot line 404 represents a lower threshold speed difference between speed of shaft 224 and speed of shaft 220 multiplied by the ratio of the gear to be engaged.

At time t0, the speed of shaft 224 is increasing and speed of shaft 220 multiplied by the ratio of the gear to be engaged (e.g., the ratio of the low range gear 208) is low. The axle gearbox may be in a neutral position at this time (not shown).

At time t1, speed of electric machine 126 begins increasing, thereby increasing the speed of shaft 220 multiplied by the ratio of the gear to be engaged in response to a request to shift the axle gearbox from neutral to a gear (high range or low range). The electric machine 126 is operating in a speed control mode (e.g., a mode where a speed of the electric machine 126 is controlled to a desired or requested speed while torque output of electric machine 126 is increased or decreased to match speed of the electric machine to the desired or requested speed) and the electric machine is commanded to the speed of line 408. The speed of the electric machine 126 and speed of shaft 220 multiplied by the gear ratio of the gear to be engaged increases between time t1 and time t2. In addition, the speed of shaft 224 continues to increase.

At time t2, the speed of shaft 220 multiplied by the gear ratio to be engaged exceeds threshold 408 and the machine now exits speed model and enters torque mode. Therefore, torque of the electric machine 126 is reduced to zero and the electric machine begins to free-wheel (e.g., rotate without producing torque via the electric machine or without absorbing driveline torque via the electric machine). The shift fork is commanded to move the synchronizers 216 and gear engagement collar 217 in gear (low range gear 208 or high range gear 218). The speed of shaft 224 continues to increase.

Between time t2 and time t3, the speed of shaft 220 multiplied by the gear ratio to be engaged declines toward the speed of shaft 224. The electric machine does not receive electrical power so its speed and speed of shaft 220 declines. The speed of shaft 224 has continued to increase since time t2.

At time t3, the initial engagement happens between the gear engagement collar and the gear (low range or high range). The synchronizers 216 engage the gear (low or high) and reduce the speed difference between the gear engagement collar 217 and the gear (low or high) so that speed of shaft 220 multiplied by the gear ratio (low or high) converges to the speed of shaft 224. Between time t3 and time t4, the engagement completes. The electric machine 126 is in a torque control mode.

At time t4, the gear engagement collar 217 locks the gear (high or low) to shaft 220 so that the speed of shaft 220 multiplied by the ratio of gear (low or high) is equal to the speed of shaft 224. The torque of the electric machine is ramped to the driver demand torque. By removing electric power from the electric machine just before the shift forks are moved, the electric machine does not work against the axle load transferred through the synchronizers so that load on the synchronizers may be reduced, thereby increasing synchronizer life.

In this way, it may be possible to shift an axle gearbox that does not include friction clutches. The electric machine may be controlled in a speed control mode to reduce the speed difference between the axle gearbox shafts. The shift forks may be moved without fighting the electric machine output via ceasing to supply electric power to the electric machine. Once the shift forks engage the new gear, the electric machine may be activated in a torque control mode to meet driver demand.

Referring now to FIG. 5, a second prophetic vehicle operating sequence according to the method of FIGS. 7 and 8 is shown. The method of FIG. 5 is a method that may be performed when the axle gearbox does not include synchronizers or friction clutches. The vehicle operating sequence shown in FIG. 5 may be provided via the method of FIGS. 7 and 8 in cooperation with the system shown in FIG. 1. The vertical lines at t10-t14 represent times of interest during the sequence. The sequence of FIG. 5 takes place when an accelerator pedal is applied by a driver such that the wheel torque request is non-zero and while the vehicle is moving on a road.

Plot 500 includes a vertical axis and a horizontal axis. The vertical axis represents speed and speed increases in the direction of the vertical axis arrow. Speed at the level of the horizontal axis is zero. The horizontal axis represents time and time increases from the left side of the plot to the right side of the plot.

Dashed line 506 represents a speed of shaft 224 of an axle gearbox and solid line 502 represents a speed of shaft 220 multiplied by the gear ratio of the gear to be or being engaged (e.g., the gear ratio between shaft 202 and shaft 224 when low gear 208 is going to be or is being engaged). Dashed-dot line 508 represents an upper threshold speed difference between speed of shaft 224 and speed of shaft 220 multiplied by the ratio of the gear to be engaged. Dashed-dot line 508 may also be referred to as an over-shoot speed. Dashed-dot line 504 represents a lower threshold speed difference between speed of shaft 224 and speed of shaft 220 multiplied by the ratio of the gear to be engaged.

At time t10, the speed of shaft 224 is increasing and speed of shaft 220 multiplied by the ratio of the gear to be engaged (e.g., the ratio of the low range gear 208) is low. The axle gearbox may be in a neutral position at this time (not shown).

At time t11, speed of electric machine 126 begins increasing, thereby increasing the speed of shaft 220 multiplied by the ratio of the gear to be engaged in response to a request to shift the axle gearbox from neutral to a lower gear ratio.

The electric machine 126 is operating in a speed control mode and its speed is commanded to the speed represented by line 508. The speed of the electric machine 126 and speed of shaft 220 multiplied by the gear ratio of the gear to be engaged increases between time t11 and time t12. In addition, the speed of shaft 224 continues to increase.

At time t12, the speed of shaft 220 multiplied by the gear ratio to be engaged settles to the desired speed difference. The speed difference between threshold 508 and shaft speed 506 is less than the speed difference between threshold 408 and shaft speed 406 shown in FIG. 4 because axle gearbox 177 does not include synchronizers so a smaller speed difference between shaft speed 506 and threshold speed 508 is tolerated. The electric machine remains in speed control mode and speed of the electric machine is commanded to maintain the desired speed difference. The speed of shaft 224 continues to increase.

Between time t12 and time t13, the speed of shaft 220 multiplied by the gear ratio to be engaged follows the speed to maintain the desired tracking to the speed of shaft 224 and the fork is commanded to move. The electric machine remains in speed control mode and the speed of shaft 224 has continued to increase since time t12. The electric machine exits speed control model and enters torque control mode before the engagement happens between the sliding sleeve or dog clutch and the desired gear (low range or high range).

At time t13, the first engagement between the sliding sleeve and the gear (low or high) happens. Between time t13 and time t14, the engagement completes and the speed of shaft 220 multiplied by the desired gear ratio (low or high) converges to the speed of shaft 224. The electric machine 126 is in a torque control mode.

At time t14, the a sliding sleeve or dog clutch 319 locks the desired gear (low or high) to shaft 220 so that the speed of shaft 220 multiplied by the ratio of desired gear (low or high) is equal to the speed of shaft 224. The torque of the electric machine is ramped to the driver demand torque.

In this way, it may be possible to shift an axle gearbox that does not include friction clutches. The electric machine may be controlled in a speed control mode until the shift forks begin to move the sliding sleeve or dog clutch toward the gear being engaged or until the sliding sleeve or dog clutch engages the gear being engaged. Operating the electric machine in the speed control mode reduces the possibility of engagement interference during shifting of the axle gearbox.

Referring now to FIG. 6, a prophetic vehicle operating sequence according to the method of FIGS. 7 and 8 is shown. The vehicle operating sequence shown in FIG. 6 may be provided via the method of FIGS. 7 and 8 in cooperation with the system shown in FIG. 1. The vertical lines at t20-t24 represent times of interest during the sequence. The sequence of FIG. 6 takes place when an accelerator pedal is applied by a driver such that the wheel torque request is non-zero and while the vehicle is moving on a road.

The first plot from the top of FIG. 6 is a plot of speed versus time. The vertical axis represents speed and speed increases in the direction of the vertical axis arrow. The horizontal axis represents time and time increases from the left side of the figure to the right side of the figure. Trace 602 represents the speed of shaft 224. Trace 604 represents the speed of shaft 220 multiplied by the ratio of the gear being or about to be engaged.

The second plot from the top of FIG. 6 is a plot of sequence states versus time. The vertical axis represents states of the sequence. The horizontal axis represents time and time increases from the left side of the figure to the right side of the figure. Line 206 represents the different states of the sequence.

The third plot from the top of FIG. 6 is a plot of electric machine torque versus time. The vertical axis represents electric machine torque and electric machine torque increases in the direction of the vertical axis arrow. The horizontal axis represents time and time increases from the left side of the figure to the right side of the figure. Trace 808 represents the electric machine torque.

At time t20, speed of shaft 224 is at a middle level and increasing. Speed of shaft 220 multiplied by the ratio of the gear about to be engaged is low and the axle gearbox is in a neutral state (not shown). The electric machine torque is zero.

At time t21, a request to change the axle ratio to a gear range (low or high) is made. The axle changes into a speed synchronization state where speed of shaft 220 multiplied by the ratio of the gear about to be engaged is commanded to the speed of shaft 224. During the synchronization state, the electric machine is operated in a speed control mode. The electric machine torque output is increased to increase the speed of shaft 220. The speed of shaft 220 multiplied by the ratio of the gear that is about to be engaged begins to increase. The speed of shaft 224 continues to increase.

At time t22, the speed of shaft 220 multiplied by the ratio of the gear that is about to be engaged exceeds a speed threshold and it is greater than the speed of shaft 224. Therefore, the electric machine torque is reduced to bring the speed of shaft 220 multiplied by the ratio of the gear that is about to be engaged toward the speed of shaft 224. The axle mode changes from speed control to torque control. The speed of shaft 224 continues to increase.

At time t23, the torque of electric machine 126 is reduced to zero so the shift forks begin to move the sleeve 319 toward the gear that is being engaged. The axle enters into a connect mode where shaft 220 is coupled to shaft 224 via engaging a gear.

At time t24, the sleeve 319 fully engages the gear being engaged (e.g., the low range gear) to shaft 220, thereby coupling shaft 224 to shaft 220. The electric machine torque is increased to provide the requested driver demand torque. The range gear (low or high) fully engages so that the speed of shaft 220 multiplied by the ratio of the engaged gear is equal to the speed of shaft 224. The electric machine is operated in a torque control mode (e.g., a mode where electric machine speed may vary while electric machine torque meets or follows a requested electric machine torque) and commanded to provide the driver demand torque.

Referring now to FIGS. 7 and 8, an example method for operating a vehicle that includes an axle with a gearbox is shown. The axle may be of the type shown in FIG. 1. The method of FIGS. 7 and 8 may be incorporated into and may cooperate with the system of FIG. 1. Further, at least portions of the method of FIGS. 7 and 8 may be incorporated as executable instructions stored in non-transitory memory while other portions of the method may be performed via a controller transforming operating states of devices and actuators in the physical world. The method of FIGS. 7 and 8 may be entered when the electric machine (e.g., 126 is operating in a torque mode and following driver demand torque).

At 701, method 700 judges if there is a request to change gear ratios of the axle gearbox. A request to change gear ratios of the axle gearbox may be generated via a human and a human/machine interface. Alternatively, an autonomous driver may request a gear ratio change of the axle gearbox.

If method 700 judges that there is a request to change gear ratios of the axle gearbox (e.g., a request to change from a high gear to a low gear or vice-versa), the answer is yes and method 700 proceeds to 702. Otherwise, the answer is no and method 700 proceeds to 750.

At 750, method 700 maintains the present operating state of the axle gearbox. The axle gearbox may remain engaged in a low gear, engaged in a high gear, or in neutral. Method 700 proceeds to exit.

At 702, method 700 judges if gear synchronizers are not present or if gear synchronizers are degraded. If so, the answer is yes and method 700 proceeds to 720. Otherwise, the answer is no and method 700 proceeds to 704.

At 704, method 700 requests shifting to a gear from neutral via adjusting a position of the shift forks to disengage a presently engaged gear. In one example, the new gear is a low range gear or low gear and the presently engaged gear is a high range gear or high gear. Alternatively, the new gear is a high range gear or high gear and the presently engaged gear is a low range gear or low gear. Method 700 proceeds to 706.

At 706, method 700 exits a torque control mode for electric machine 126 and operates electric machine 126 in a speed control mode. Method 700 commands electric machine 126 to a speed such that electric machine rotates a shaft that supports gear engagement collar 217 (e.g., shaft 220) at a speed that when multiplied by the gear ratio between the shaft that supports gear engagement collar 217 and the axle gearbox output shaft (e.g., 224) is equal to the axle gearbox output shaft speed (e.g., speed of shaft 224) plus an overshoot or threshold speed. Note that the speed of the electric machine 126 may be different than the speed of the shaft supporting gear engagement collar 217 due to any gearing that may be between the electric machine 126 and shaft 220 that supports the gear engagement collar 217. Thus, if the speed of output shaft 224 is 400 RPM and the overshoot speed is 50 RPM, then speed of the electric machine is adjusted such that speed of the shaft that supports gear engagement collar 217 may be adjusted to a speed of 450 RPM divided by a gear ratio between the shaft that supports gear engagement collar 217 and the output shaft, the gear ratio including the gear being engaged. Method 700 proceeds to 708.

At 708, method 700 judges if the speed of the shaft that supports gear engagement collar 217 multiplied by the gear ratio (GR) being engaged between the shaft that supports gear engagement collar 217 and the output shaft 224 minus speed of output shaft 224 is greater than or equal to an overshoot speed (e.g., 50 RPM), if so the answer is yes and method 700 proceeds to 710. Otherwise, the answer is no and method 700 returns to 706.

At 710, method 700 exits the electric machine 126 from speed control mode and reduces electric machine torque to zero. The torque of electric machine 126 may be reduced to zero in a threshold amount of time. Method ceases supplying electric power to electric machine 126 and the electric machine begins to free-wheel. Method 700 proceeds to 712.

At 712, method 700 moves the shift fork 212 to engage the requested gear. The shift fork moves the gear engagement collar 217 and the synchronizers 216 so that the synchronizers 216 engage the gear 208 or gear 218. Method 700 proceeds to 714.

At 714, method 700 begins supplying electric current to electric machine 126 when the shift fork 212 reaches an end of travel and the requested gear is fully engaged. The torque of the electric machine 126 is adjusted so that the requested driver demand torque is delivered. Thus, electric current delivery to electric machine 126 may be delayed until the gear is fully engaged so that torque exchanged between the gear being engaged and the gear shift collar may be reduced to reduce the possibility of gearbox degradation. Method 700 proceeds to exit.

At 720, method 700 requests shifting to gear from neutral via adjusting a position of the shift forks to disengage a presently engaged gear. In one example, the new gear is a low range gear or low gear and the presently engaged gear is a high range gear or high gear. Alternatively, the new gear is a high range gear or high gear and the presently engaged gear is a low range gear or low gear. Method 700 proceeds to 722.

At 722, method 700 exits a torque control mode for electric machine 126 and operates electric machine 126 in a speed control mode. Method 700 commands electric machine 126 to a speed such that electric machine rotates a shaft that supports gear engagement collar 217 (e.g., shaft 220) at a speed that when multiplied by the gear ratio between the shaft that supports gear engagement collar 217 and the axle gearbox output shaft (e.g., 224) is equal to the axle gearbox output shaft speed (e.g., speed of shaft 224) plus a predetermined overshoot or threshold speed (e.g., 5-30 RPM). Note that the speed of the electric machine 126 may be different than the speed of the shaft supporting sleeve 319 due to any gearing that may be between the electric machine 126 and shaft 220 that supports the sleeve 319. Thus, if the speed of output shaft 224 is 400 RPM and the overshoot speed is 10 RPM, then speed of the electric machine is adjusted such that speed of the shaft that supports sleeve 319 may be adjusted to a speed of 410 RPM divided by a gear ratio between the shaft that supports sleeve 319 and the output shaft, the gear ratio including the gear being engaged. Method 700 proceeds to 724.

At 724, method 700 judges if the speed of the shaft that supports sleeve 319 multiplied by the gear ratio (GR) being engaged between the shaft that supports sleeve 319 and the output shaft 224 minus speed of output shaft 224 is greater than or equal to an overshoot speed (e.g., 10 RPM), if so the answer is yes and method 700 proceeds to 726. Otherwise, the answer is no and method 700 returns to 722.

At 726, method 700 judges if the average speed of the shaft that supports sleeve 319 multiplied by the gear ratio being engaged between the shaft that supports sleeve 319 and output shaft 244 is substantially equal to the average speed of output shaft 244 (e.g., the speeds are within 5% of each other). If so, the answer is yes and method 700 proceeds to 728. Otherwise, the answer is no and method 700 returns to 726.

At 728, method 700 moves or commands the shift fork 212 to move the sleeve or dog clutch 319 to engage the requested gear while continuing to operate electric machine 126 in a speed control mode such that speed of shaft 220 multiplied by the gear ratio being engaged between the shaft 220 and shaft 224 is within the overshoot speed of the speed of shaft 224. Method 700 proceeds to 730.

At 730, method 700 judges if the shifting fork 212 is in a desired position. In one example, the desired position may be a position that is greater than 95% of an air gap distance. In another example, the desired position may be an end of travel position. If method 700 judges that shifting fork 212 is in a desired position, the answer is yes and method 700 proceeds to 732. Otherwise, the answer is no and method 700 returns to 730.

At 732, method 700 exits the electric machine 126 from speed control mode and enters the electric machine into torque control mode. Method 700 proceeds to 734.

At 734, method 700 continues to move the shift fork to an end of travel position if the shift fork is not at an end of travel position. At the end of travel the torque of the electric machine is increased to meet driver demand. Method 700 proceeds to exit.

In this way, an electric machine may be operated in a speed control mode so that torque exchanged between an output shaft 224 of an axle gearbox and a shaft that includes a gear locking mechanism may be reduced during a gear shift. The gear shift may be performed with an axle gearbox that includes synchronizers or with an axle gearbox that does not include synchronizers.

Thus, the method of FIGS. 7 and 8 provides for a method for operating a driveline, comprising: while an axle is rotating a gear of an axle gearbox that does not include a friction clutch, adjusting a speed of an electric machine such that a speed of a first shaft multiplied by a ratio of a gear between the first shaft and a second shaft is a threshold speed amount greater than a speed of the second shaft; reducing an amount of electric power supplied to the electric machine in response to the speed of the first shaft multiplied by the ratio of the gear between the first shaft and the second shaft being the threshold speed amount greater than the speed of the second shaft; and adjusting a position of a shift fork in response to reducing electric power supplied to the electric machine. The method includes where reducing the amount of electric power supplied to the electric machine includes ceasing to supply electric power to the electric machine, where the second shaft is an output shaft of the axle gearbox, where the electric machine is coupled to the first shaft, and where the first shaft supports a gear engagement collar. The method includes where adjusting the position of the shift fork in response to reducing electric power supplied to the electric machine includes adjusting the position of the shift fork in response to ceasing to supply electric power to the electric machine. The method includes where a synchronizer is coupled to the shift fork. The method further comprises increasing torque of the electric machine in response to the shift fork reaching an end of travel position. The method includes where the axle gearbox is coupled to a differential of the axle. The method includes where the electric machine is coupled to the axle gearbox.

The method of FIGS. 7 and 8 also provides for a method for operating a driveline, comprising: while an axle is rotating a gear of an axle gearbox that does not include a friction clutch, adjusting a speed of an electric machine such that a speed of a first shaft multiplied by a ratio of a gear between the first shaft and a second shaft is a threshold speed amount greater than a speed of the second shaft, the first shaft and the second shaft included in the axle gearbox; and adjusting a position of a shift fork in response to an average speed slope of the first shaft multiplied by the ratio of the gear between the first shaft and the second shaft being substantially equal to an average speed slope of the second shaft. The method includes where the electric machine is operated in a speed control mode while adjusting the speed of the electric machine, where the second shaft is an output shaft of the axle gearbox, where the electric machine is coupled to the first shaft, and where the first shaft supports a gear engagement collar. The method further comprises exiting the speed control mode and entering the electric machine into a torque control mode in response to the shifting fork being at a desired position. The method further comprises continuing to move the shift fork to an end of travel position. The method includes where the axle gearbox is coupled to a differential.

In another representation, the method of FIGS. 7 and 8 provides for a method for operating a driveline, comprising: while an axle is rotating a gear of an axle gearbox that does not include a friction clutch, shifting gears of an axle gearbox via operating an electric machine in a speed control mode and adjusting a position of a shift fork when a speed of a first axle gearbox multiplied by a ratio of a gear being engaged is within a threshold speed of a second axle. The method includes where the first shaft support a gear engagement collar. The method includes where the second shaft is an output shaft of the axle gearbox, and where the output shaft of the axle gearbox is coupled to a differential.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a driveline, comprising:
   while a first shaft is directly and uninterruptedly connected to an electric machine, a second shaft, a first gear ratio, and a second gear ratio are directly and uninterruptedly connected to wheels of a vehicle, and the vehicle is in motion:
   adjusting a speed of an electric machine to create a first speed condition where a speed of a first shaft multiplied by one of the first or second gear ratios is a threshold speed amount greater than a speed of the second shaft, wherein each of the first and second gear ratios comprises a gear positioned on the first shaft and a gear positioned on the second shaft;
   in response to the first condition being met, eliminating power supplied to the first shaft from the electric machine; and
   in response to the first speed condition being met and eliminating power to the first shaft, adjusting a position of a shift fork to engage a different gear ratio to the first shaft, the engaging of the different gear ratio occurring while an axle is rotating the second shaft, the first gear ratio, and the second gear ratio, and the engaging does not involve use of a friction clutch.

2. The method of claim 1, where a synchronizer is coupled to the shift fork, a first gear, and a second gear to connect the first shaft and the second shaft.

3. The method of claim 1, further comprising increasing torque of the electric machine in response to the shift fork reaching an end of travel position.

4. The method of claim 1, where a first gear and a second gear are located on the first shaft and are engaged with respective gears on the second shaft, and the shift fork connects the first gear or the second gear with the first shaft.

5. The method of claim 1, wherein the only clutch or disconnect between the electric machine and the wheels is the shift fork engaging the first gear ratio and the second gear ratio to the first shaft.

6. The method of claim 5, wherein eliminating power supplied to the first shaft from the electric machine in response to the first condition being met prevents the electric machine from supplying power to the first shaft in response to load from the rotating axle during the engaging of the first or second gear ratio.

7. The method of claim 1, wherein the electric machine is placed into a control mode that prevents the electric machine from supplying power to the first shaft in response to load from the rotating axle during the engaging of the first or second gear ratio.

8. A method for operating a driveline, comprising:
   while a first shaft is directly and uninterruptedly connected to an electric machine, a second shaft, a first gear ratio, and a second gear ratio are directly and uninterruptedly connected to wheels of a vehicle, and the vehicle is in motion:
   adjusting a speed of an electric machine to create a first speed condition where a speed of a first shaft multiplied by one of the first or second gear ratios is equal to a speed of the second shaft and an overshoot speed, wherein each of the first and second gear ratios comprises a gear positioned on the first shaft and a gear positioned on the second shaft;
   in response to the first condition being met, eliminating torque supplied to the first shaft from the electric machine; and
   after the eliminating of torque to the first shaft and the speed of the first shaft reducing from the overshoot speed, adjusting a position of a shift fork to engage a different gear ratio to the first shaft, the engaging of the different gear ratio occurring while an axle is rotating the second shaft, the first gear ratio, and the second gear ratio, and the engaging the different gear ratio does not involve use of a friction clutch.

9. The method of claim 8, wherein a synchronizer is coupled to the shift fork.

10. The method of claim 8, wherein in a time between the eliminating of torque to the first shaft and the adjusting of the position of the shift fork, the speed of the first shaft decreases and a difference between the speed of the first shaft and the second shaft decreases.

11. The method of claim 8, wherein the overshoot speed is between 5 and 50 RPM.

12. The method of claim 8, wherein the engaging the different gear ratio does not involve use of a synchronizer.

13. The method of claim 8, wherein when torque to the first shaft is eliminated, the electric machine does not produce torque or absorb driveline torque.

14. The method of claim 8, wherein the adjusting the speed of the electric machine, the eliminating the torque, and the adjusting a position of a shift fork occur while a requested torque is non-zero and a vehicle is moving.

15. The method of claim 8, wherein the electric machine is placed into a control mode which prevents application of torque to the first shaft during the engagement of the first or second gear ratio.

16. The method of claim 8, wherein the electric machine is the sole propulsion source in the driveline.

17. The method of claim 8, wherein the first and second gear ratios are the only gear ratios in the driveline.

18. The method of claim 8, wherein the gears of the first and second gear ratios are being driven by movement of the wheels during the engagement of the first and second gear ratios.

* * * * *